United States Patent [19]

Pope et al.

[11] 4,076,291

[45] Feb. 28, 1978

[54] TAMPER-RESISTANT ELECTRIC METER SEALING RING

[76] Inventors: William M. Pope, 748 Newberry Road, Nashville, Tenn. 37205; William M. Pope, Jr., 923 Parrish Road, Knoxville, Tenn. 37919

[21] Appl. No.: 746,315

[22] Filed: Dec. 1, 1976

[51] Int. Cl.² ............... B65D 45/32; B65D 55/02
[52] U.S. Cl. ................ 292/256.67; 24/280; 292/307 R
[58] Field of Search ......... 24/279, 280; 292/307 B, 292/325, 256.67, 307 R; 85/61, 1 SS; 151/24; 403/2, 362; 285/410, 411

[56] References Cited

U.S. PATENT DOCUMENTS

| | | | |
|---|---|---|---|
| 250,448 | 12/1881 | Little, Jr. | 151/24 |
| 720,806 | 2/1903 | Hiett | 292/325 |
| 784,014 | 2/1905 | Steel | 151/24 |
| 785,526 | 3/1905 | Simpson | 292/307 B |
| 1,039,576 | 9/1912 | Mueller et al. | 292/307 B |
| 3,867,822 | 2/1975 | Morse et al. | 24/280 |

*Primary Examiner*—Kenneth J. Dorner
*Attorney, Agent, or Firm*—Harrington A. Lackey

[57] ABSTRACT

A sealing ring assembly for an electric meter including a pair of radially projecting spaced ears having aligned rivet holes through which an elongated rivet is received. The rivet, of substantially hard material, such as case-hardened steel, is held in position by a sleeve, fitted over the free end of the rivet, and a set screw in the sleeve radially bearing against the rivet, the set screw being a shear-headed type in which the head has been sheared off substantially flush with the radial exterior surface of the sleeve.

3 Claims, 3 Drawing Figures

TAMPER-RESISTANT ELECTRIC METER SEALING RING

BACKGROUND OF THE INVENTION

This invention relates to electric meters, and more particularly to a tamper-resistant sealing ring for an electric meter.

The conventional way of indicating tampering with an electric meter is to insert a wire through holes in the sealing ring coupling the cover and socket of an electric meter, and securing the free ends of the wires together with a soft metal, such as lead. If an inspector finds that the wire or seal has been broken, this is usually sufficient evidence that someone, and probably the customer, has been tampering with his electric meter.

However, various ways have been designed to by-pass the sealing wires or to substitute a new sealing wire for a broken sealing wire.

Other types of devices and mechanisms have been designed to render electric meters tamper-proof or tamper-resistant, but most of such devices involve more complicated mechanisms, some of which are ineffective.

SUMMARY OF THE INVENTION

It is therefore an object of this invention to provide a more effective tamper-resistant device for an electric meter, and certainly more effective than the conventional sealing wire.

Another object of this invention is to provide a tamper-resistant apparatus for an electric meter which is of relatively simple construction, and relatively inexpensive.

The tamper-resistant device made in accordance with this invention includes a sealing ring assembly for an electric meter, including a sealing ring of substantially the same construction as a conventional sealing ring. However, the radially projecting ears of the sealing ring made in accordance with this invention include a pair of aligned rivet holes through which a rivet having a head on one end and an opposite free end projects through the rivet holes. The projecting free end portion of the rivet receives a mating sleeve through the wall of which is threaded a radial shear-head set screw, which is screwed radially inward until it bears firmly against the shank of the rivet. Further turning of the set screw causes the shear head to shear off so that the radial outer portion of the sheared set screw is substantially flush with the outer surface of the sleeve.

Once the set screw has been tightened and the head sheared off, the rivet cannot be removed without damaging or destroying some portion of the sealing ring assembly, such as the sealing ring itself, the rivet or the sleeve. Destruction or damage to any one of these parts will be a clear visible indication of tampering with the meter.

In order to render the tampering more difficult, the rivet is preferably made of a very hard material, such as case-hardened steel. Thus, when the rivet is made of such hard material, attempts to tamper with the meter may not be successful, and yet still leave indicator marks of the tampering attempt.

It is also within the scope of this invention to provide the sealing ring with slightly longer ears than a conventional sealing ring to accommodate a second pair of aligned bolt holes for receiving a bolt radially outward of the rivet. The bolt is turned to gradually draw the ears together in order to tighten and hold the sealing ring about the flanges of the meter cover and the meter socket.

DESCRIPTION OF THE PREFERRED EMBODIMENTS

Figure 1:
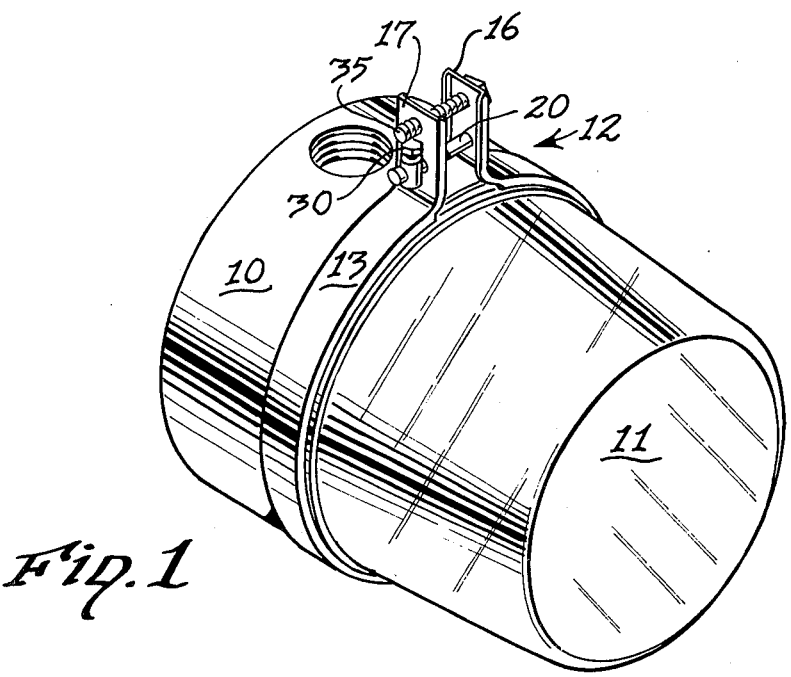
FIG. 1 is a perspective view of an electric meter cover coupled to a meter socket by a sealing ring made in accordance with this invention, but before the head of the set screw has been sheared off.

Referring now to the drawings in more detail, a conventional electric meter is housed within a socket 10 against which is coupled a transparent cover 11 by a sealing ring, such as the sealing ring assembly 12, made in accordance with this invention. The sealing ring assembly 12 includes an annular rim 13, preferably channel-shaped facing radially inward to accommodate the opposing flanges of the socket 10 and cover 11, such as the cover flange 14.

The rim 13 is continuous except for a split opening 15 defined by a pair of radially outward projecting ears 16 and 17. As disclosed in the drawings, the ears 16 and 17, being radial extensions of the rim 13, are also channel-shaped, opening toward each other. The rim 13 and ears 16 and 17 are made of a very hard material, such as a very hard steel.

Formed in the base portions of the ears 16 and 17, or the portions adjacent the opening 15, are a pair of rivet holes 18 and 19, which are preferably of uniform size and are also axially aligned, to receive an elongated rivet 20. The rivet 20 is substantially longer than the normal spacing between the rivet holes 18 and 19 and is preferably made of a very hard material, such as case-hardened steel. The rivet 20 includes a head 21, an elongated cylindrical shank 22 and a free end 23.

The rivet 20 is adapted to be received coaxially within the rivet holes 18 and 19 until the head 21 abuts flush against the exterior surface of the ear 16, so that a substantial free end portion 24 of the shank 22 projects in the opposite direction from the opposite hole 19.

Figure 2:
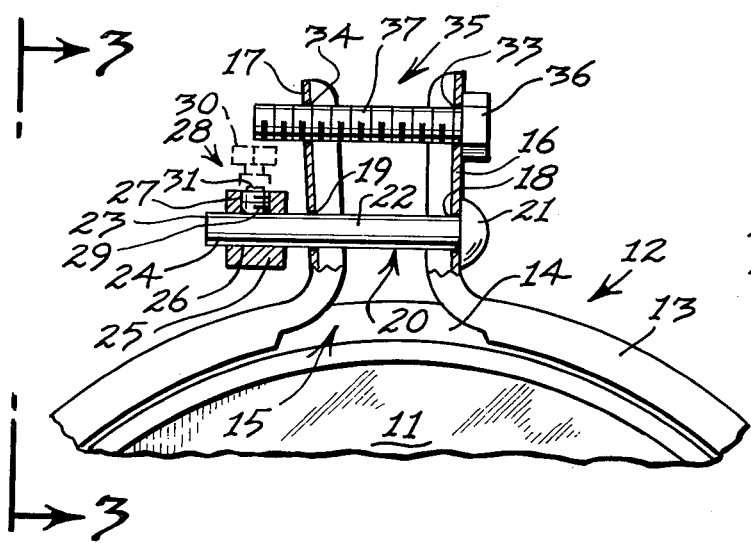
FIG. 2 is an enlarged, fragmentary, front elevation of the upper portion of the sealing ring assembly, with portions broken away, disclosing the head of the set screw sheared off.
Figure 3:
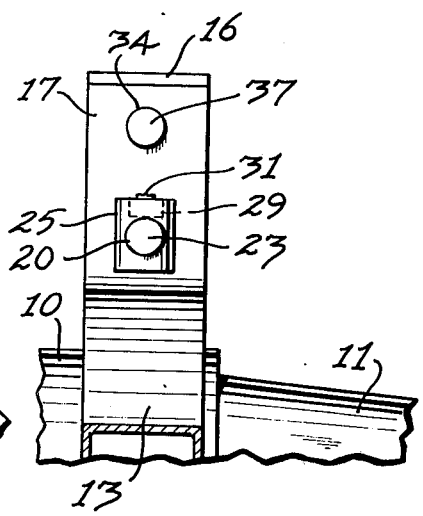
FIG. 3 is a section taken along the line 3—3 of FIG. 2.

The projecting portion 24 is slidably received within the bore 26 of a sleeve 25. A threaded set screw hole 27, extending radially through the sleeve 25, threadedly receives a shear-head set screw 28 having a threaded body portion 29 and a head 30, shown in solid lines in FIG. 1 and in phantom in FIG. 2. The depth of the set screw hole 27 and the height of the shear-head set screw 28 are such that the body portion 29 engages the surface of the projecting shank portion 24 of the rivet 20. Continued turning of the set screw 28 will cause the head 30 to shear along the surface 31 substantially flush with the outer surface of the sleeve 25. Thus, once the head 30 has sheared off, unthreading the set screw 28 will be practically impossible. Furthermore, removing the rivet 20 in any other manner would be extremely difficult without damaging or destroying some part of the sealing ring assembly 12. Once the head 30 has been sheared by turning the set screw 28, the elongated rivet 20 is irreversibly locked upon the ears 16 and 17.

Formed in the ears 16 and 17, radially outward from the rivet holes 18 and 19 are a pair of aligned bolt holes 33 and 34 adapted to receive a bolt 35 having a head 36 and threaded shank 37. The bolt hole 34 is adapted to threadedly engage the shank 37 so that continued turning of the bolt 36 will draw the ears 16 and 17 together until the rim 13 is properly tensioned in its locking or clamping position about the cover 11 and the socket 10.

Actually, the bolt 35 is inserted and turned in the bolt holes 33 and 34 to draw the ears 16 and 17 together, before the rivet 20 is inserted into its respective holes 18 and 19 and locked in place by the sleeve 25 and the set screw 28.

The bolt holes 33 and 34 are spaced radially outward from the rivet holes 18 and 19 a sufficient distance to permit manipulation of the bolt 35 and also the rivet 20 as well as the set screw 28. Actually, the sleeve 25 may be rotated about the projecting shank portion 24 to a position in which the head 30 of the set screw 28 is out of the way of the projecting free end of the bolt 35, so that the head 30 may be easily and freely turned.

The rivet 20 is located adjacent the opening 15 and radially inward of the bolt 35, to make it more difficult to cut the rivet shank 22, and also to make it more difficult to bend the ears 16 and 17 adjacent the opening 15. If the positions of the threaded bolt 35 and the rivet 20 were reversed from their relative positions disclosed in the drawings, the bolt 35 could be easily removed by an unauthorized person, leaving considerable space between the rivet 20, in the outer position of the bolt 35, and the opening 15. Accordingly, the portions of the ears 16 and 17, adjacent the opening 15, might be easily bent, and the sealing ring rim 13 removed without altering or destroying the rivet 20.

What is claimed is:

1. A tamper-resistant sealing ring assembly for an electric meter, comprising:

(a) a sealing ring member of a very hard material having a rim adapted to couple the cover of an electric meter to the socket for the meter,
    (b) said sealing ring member having an opening in its rim defined by a pair of opposed, spaced, elongated ears projecting substantially radially outward from said rim,
    (c) each ear having a uniform rivet hole extending therethrough adjacent said opening, said rivet holes being axially aligned,
    (d) an elongated rivet of very hard material having a head, a shank longer than the normal spacing between said rivet holes, and a free
    (e) said shank extending through said holes so that said head is held against one ear while said free end projects substantially beyond the hole in said opposite ear,
    (f) a sleeve having a radial set screw hole and fitting over said free end and upon the portion of said shank projecting beyond said opposite hole,
    (g) a shear-head set screw received in said set screw hole sufficiently to bear against said shank, the head of said set screw having been sheared off so that the radial outer portion of said set screw is substantially flush with said sleeve to hold said rivet in the holes of said ears, and
    (h) said sleeve being fixed upon said shank close enough to the adjacent ear, and said rivet in said rivet holes being close enough to said opening, that said sealing ring member cannot be deformed sufficiently to be removed from said electric meter.

2. The invention according to claim 1 in which said ears comprise bent extensions of said ring member.

3. The invention according to claim 1 further comprising a bolt hole in each of said ears, said bolt holes being axially aligned and spaced radially outward from said rivet holes, an elongated bolt through said bolt holes and threadedly engaging at least one of said bolt holes.

* * * * *